D. T. GILLIS.
Grain-Headers.

No. 157,961.

2 Sheets--Sheet 1.

Patented Dec. 22, 1874.

Attest:—
C. Clarence Poole,
W. E. Chaffee

Inventor:—
David T. Gillis
By J. B. Woodruff
Attorney

2 Sheets--Sheet 2.

D. T. GILLIS.
Grain-Headers.

No. 157,961. Patented Dec. 22, 1874.

Attest:—
C. Clarence Poole,
W. E. Chaffee

Inventor:—
David T. Gillis
By J. B. Woodruff
Attorney

UNITED STATES PATENT OFFICE.

DAVID T. GILLIS, OF STOCKTON, CALIFORNIA.

IMPROVEMENT IN GRAIN-HEADERS.

Specification forming part of Letters Patent No. 157,961, dated December 22, 1874; application filed July 28, 1874.

*To all whom it may concern:*

Be it known that I, DAVID T. GILLIS, of Stockton, in the county of San Joaquin and State of California, have invented certain new and useful Improvements in Headers for Grain; and the following is a full, clear, and exact description of the same, reference being had to the accompanying drawings making a part of this specification, in which—

Figure 1:
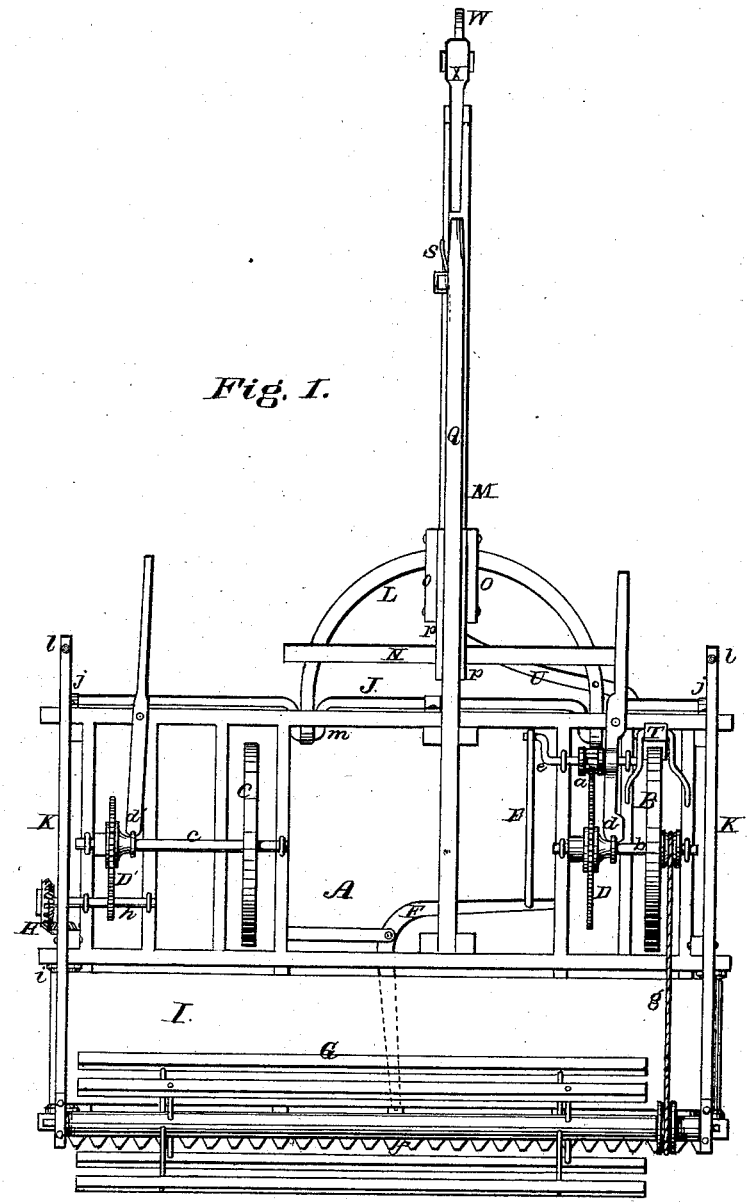
Figure 2:
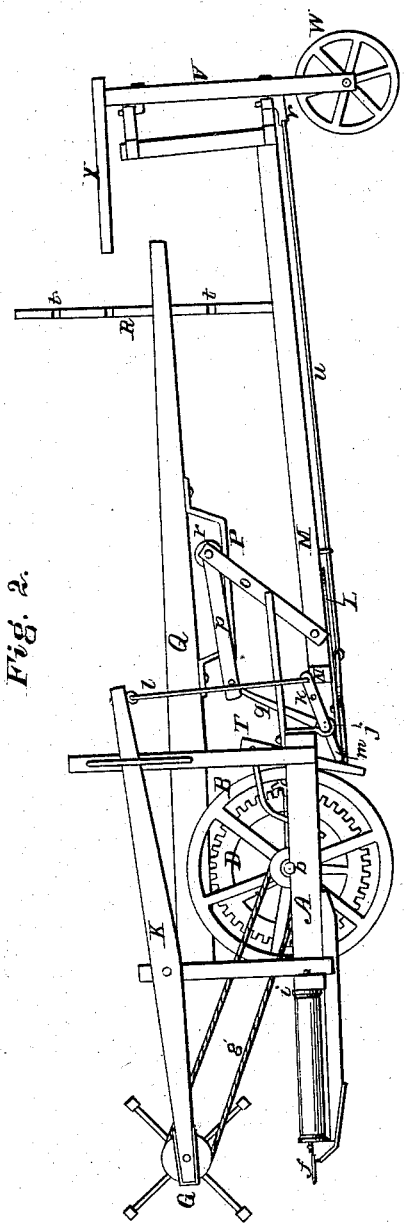
Figure 3:
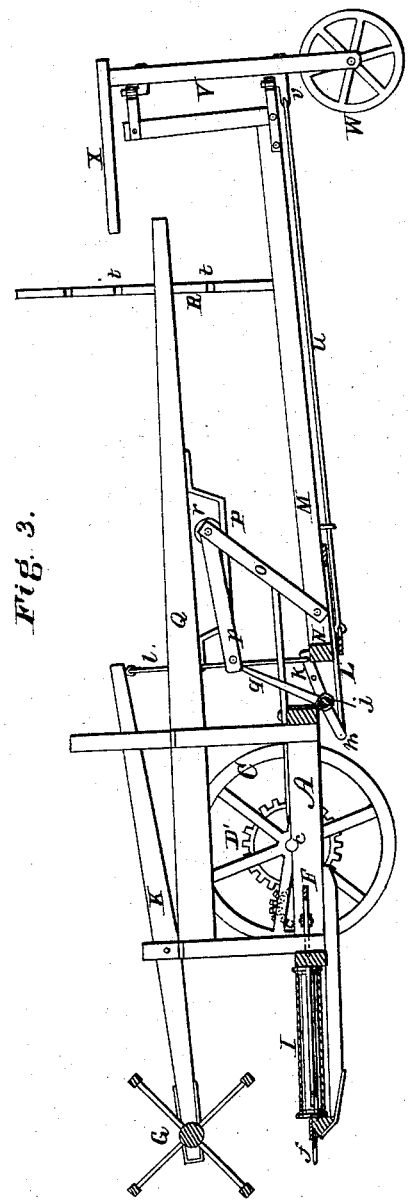

Figure 1, Plate 1, represents a plan or top view, showing the arrangement of a portion of the working parts. Fig. 2, Plate 2, represents a side view of the same, showing other parts of my improvements. Fig. 3, Plate 2, shows a longitudinal sectional view through the center of the header.

My invention consists, first, in attaching the draft-pole in the rear to a crank-shaft, or, more properly, a rock-shaft, by lugs or boxes, secured to the rear timber of the frame, in combination with the parallel lever above the timber and its auxiliary devices to adjust the height of the front or cutting portion of the header to the height of the grain, at the same time bringing the reel nearer to the cutter-bar when the heads of the grain are short and the stubble low; secondly, the arrangement and application of a brake to the right-hand wheel, that operates the sickle, to hold the wheel and cutter from operating when making a short or square turn in either direction, the said brake being connected and combined with the steering-wheel, that supports the rear end of the pole to which the team is attached to operate the grain-header.

To enable others to make and use my improved implement or machine, I will describe it more in detail, referring to the several figures in the drawings and the letters marked thereon.

The timber-frame A, constructed in such form as best adapted to arrange and apply my improvements, is shown in Fig. 1, and needs no particular description. The two wheels B and C, on which the frame A is supported, are secured on independent shafts, $b$ and $c$, and provided with moving clutches, $d\ d'$, to throw them in and out of gear with the spur-gear wheels D D'. The left-hand spur-gear D drives the pinion $a$ on a crank-shaft, $e$, which is connected by the coupling-bar E to the right-angle lever F, that is pivoted centrally to and works the sickle-bar $f$. The reel G is revolved by the belt $g$, connecting it with the pulley on the left-hand shaft $b$; the above-described portion of the header being operated entirely independent of the other mechanism. The other driving-wheel, C, being on an independent shaft, $c$, has also a spur-gear wheel, D', connected by the clutch and lever $d'$, to throw it in or out of gear, it meshing into a pinion on the shaft $h$, on the outer end of which is a bevel-gear and pinion, H, to drive the roller $i$, that carries the endless-belt apron I, on which the heads of grain drop by the action of the reel G, and are retained or carried by the traveling belt I to the right, and deposited in a wagon, or other receptacle, attached to the machine alongside for the purpose. In passing trees, and such places as the header and wagon cannot run together, the dropper or apron I can be thrown out of gear and stopped for a short time, allowing the sickle $f$ and reel G to run, to cut, and lodge the heads on the apron, and on coming together put into gear, and deliver and save the grain that otherwise would be lost. To the rear timber of the frame A, near both ends and in the middle, are secured lugs or boxes $j\ j$, in which a crank or rock shaft, J, is fitted, having at both ends arms $k$ $k$ extending back, to which the levers K K are connected by rods $l\ l$, to raise or lower the reel G, which has its bearings in the front ends of the said lever or bars K K. To cranks $m\ m$ on the rock-shaft J the rear and driving pole M is attached by a semicircular brace, L, secured to it and the cross-bar N, and near to which are pivoted the arms O O, coupling-bars $p\ p$, which connect with a vertical arm, $q$, on the rock-shaft J. This double-jointed device is provided with a friction-roller, $r$, which passes between the metal strap P on the under side of the fixed bar or lever Q, and also a notched vertical standard, R, is secured to the pole M, and a spring-catch to the bar Q, the whole device being arranged in such manner that when the front of the header and cutting is low the draft of the team, by means of the said device, will assist in raising the front of the header when liberated by the spring-catch S from the notches $t\ t$ in the standard-bar R, and at the same time correspondingly adjust the height of the reel G to the cutting or sickle bar $f$, so that when it is down in position for cutting the heads from low grain the reel will be close to the sickle, and when raised for higher grain the reel is drawn up from the sickle. To the left-hand driving-wheel B I apply a brake, T, which is operated by lever U, pivoted to the under side of the brace L, and connected by a rod, $n$, under the draft-pole or timber M, and attached to an arm, $v$, on the post V, in which the steering-wheel W is secured, so that when the steering-wheel is turned by the lever X on the top in such position as to make a square turn of the machine, it forces the brake T against the wheel B, which forms a pivot; but when the machine describes a circle the brake is not in a position to affect it.

What I claim as my invention is—

1. The driving-pole M, in combination with the rock-shaft J, provided with arms $k$ and cranks $m$, jointed levers $o\ p\ q$, roller $r$, strap P, bar Q, notched standard R, and catch-spring S, for adjusting the height of reel G to the height of the grain to be headed, substantially as herein set forth.

2. The brake T, when operated by the lever X, arm $v$ on post V, connecting-rod $n$ of the steering-wheel W, in the manner herein shown and described, for the purpose specified.

In testimony whereof I hereunto subscribe my name.

DAVID T. GILLIS.

Witnesses:
   GEO. PERRY,
   S. FISHER.